(12) United States Patent
Inserra Imparato et al.

(10) Patent No.: US 8,869,631 B2
(45) Date of Patent: Oct. 28, 2014

(54) METHOD FOR DETECTING THE THICKNESS OF THE WALLS OF HOLLOW MANUFACTURED BODIES MADE FROM NON-FERROMAGNETIC MATERIAL

(75) Inventors: Sabato Inserra Imparato, Gragnano (IT); Felice Grosso, Foggia (IT); Vincenzo Pelusi, Cagnano Varano (IT); Marco Raffone, Naples (IT); Alfonso Delli Carri, Foggia (IT); Carlo Arnone, Torre Del Greco (IT)

(73) Assignee: Alenia Aeronautica S.p.A., Pomigliano d'Arco, Naples (IT)

( * ) Notice: Subject to any disclaimer, the term of this patent is extended or adjusted under 35 U.S.C. 154(b) by 338 days.

(21) Appl. No.: 13/291,834

(22) Filed: Nov. 8, 2011

(65) Prior Publication Data

US 2012/0111126 A1    May 10, 2012

(30) Foreign Application Priority Data

Nov. 10, 2010    (IT) ............................. TO2010A0896

(51) Int. Cl.
*G01L 1/00*    (2006.01)
*G01B 7/06*    (2006.01)

(52) U.S. Cl.
CPC ...................................... *G01B 7/10* (2013.01)
USPC .................................................... 73/862.541

(58) Field of Classification Search
CPC .................................................. G01N 27/825
USPC ..................................... 73/862.541, 862.381
See application file for complete search history.

(56) References Cited

U.S. PATENT DOCUMENTS

| | | | |
|---|---|---|---|
| 2,834,938 A * | 5/1958 | Cunningham | 324/231 |
| 3,864,625 A * | 2/1975 | Zumbach et al. | 324/231 |
| 5,454,895 A | 10/1995 | Imparato | |
| 5,497,086 A * | 3/1996 | Hynek et al. | 324/228 |
| 2004/0148730 A1 * | 8/2004 | Knight et al. | 15/339 |
| 2006/0266123 A1 * | 11/2006 | Georgeson et al. | 73/634 |

FOREIGN PATENT DOCUMENTS

| | | |
|---|---|---|
| DE | 36 11 798 A1 | 6/1987 |
| GB | 575 150 A | 2/1946 |
| GB | 907721 A | 10/1962 |
| GB | 1060700 | 3/1967 |

OTHER PUBLICATIONS

English Language Translation of DE 3611798 A1, Hacklinger.*
Italian Search Report for corresponding Italian Patent Application No. TO 20100896 mailed Apr. 5, 2011.
Extended European Search Report for corresponding European Patent Application No. 11188057.1 mailed Dec. 15, 2011.

\* cited by examiner

*Primary Examiner* — Lisa Caputo
*Assistant Examiner* — Philip Cotey
(74) *Attorney, Agent, or Firm* — Merchant & Gould P.C.

(57) ABSTRACT

A hollow manufactured body has at least one wall of non-ferromagnetic material with an outer surface and an inner surface facing a cavity of the body. Two mutually magnetically attracted sliders are positioned on the inner and outer surfaces. The outer slider is moved manually across the outer surface to a predetermined point where the wall thickness is to be detected; the inner slider on the inner surface follows the movements of the outer slider due to the effect of the magnetic attraction. A transducer on the outer slider is used to measure the force required to move a magnet away from the outer surface of the wall. The value of the thickness of the wall at the predetermined point is then derived from the measured force.

13 Claims, 1 Drawing Sheet

METHOD FOR DETECTING THE THICKNESS OF THE WALLS OF HOLLOW MANUFACTURED BODIES MADE FROM NON-FERROMAGNETIC MATERIAL

This application claims benefit of Serial No. TO2010A000896, filed 10 Nov. 2010 in Italy and which application is incorporated herein by reference. To the extent appropriate, a claim of priority is made to each of the above disclosed applications.

BACKGROUND OF THE INVENTION

The present invention relates to a method for detecting the thickness of the walls of hollow manufactured bodies, including but not limited to elongate hollow manufactured bodies, having cross sections of any shape, such as tubes, air intakes for engines, hollow shafts for boats, and the like. The method can be used on manufactured bodies made from non-ferromagnetic materials such as carbon fiber composites, aluminium, wood, and others.

The present invention was developed in the field of aircraft manufacture, for the purpose of measuring the thickness of the walls of elongate hollow bodies used in the manufacture of beams made of fiber-reinforced curable thermosetting material (known as "composite material"), such as wing spars and fuselage longerons. The use of elongate hollow bodies of the aforesaid type is described in U.S. Pat. No. 5,454,895 which discloses a method for manufacturing a composite box structure. The method requires the provision of hollow bodies of elongate shape (called "plugs"), made from composite material, which are enclosed in an impermeable tubular bag. In order to monitor the temperature variations in the composite material while it is polymerized in an autoclave, it is necessary to know the thermal inertia, and consequently the thickness, of the walls of the hollow bodies at various points. The hollow bodies generally have a rectangular or trapezoidal cross section and a considerable length (typically 10-12 m). Their outer surfaces are milled to make them as smooth and accurate as possible, but their inner surfaces, of irregular shape, are not known, and therefore the thickness of the wall of the plug is not known.

The thickness of the wall of a hollow manufactured body of the aforesaid type cannot be measured precisely by using ultrasonic instruments; the raw composite material from which the plug is made has a degree of porosity such that the ultrasonic signal is dispersed and measurement becomes unreliable. There has also been a proposal to detect the thickness of the walls by measuring the Foucault currents induced in a conductive plate which is kept in contact with the inner surface of the wall. This means that the plate must be of considerable size, and therefore tends to bear on the crests of the inner surface, thus falsifying the result.

SUMMARY OF THE INVENTION

The object of the present invention is to overcome the limits of the prior art discussed above and to measure the thicknesses of the walls of hollow bodies of non-ferromagnetic material in a reliable way, using a simple and economical instrument.

BRIEF DESCRIPTION OF THE DRAWINGS

A preferred embodiment of the method according to the invention will now be described; reference will be made to the attached drawings, in which.

DETAILED DESCRIPTION OF THE PREFERRED EMBODIMENT

Figure 1:
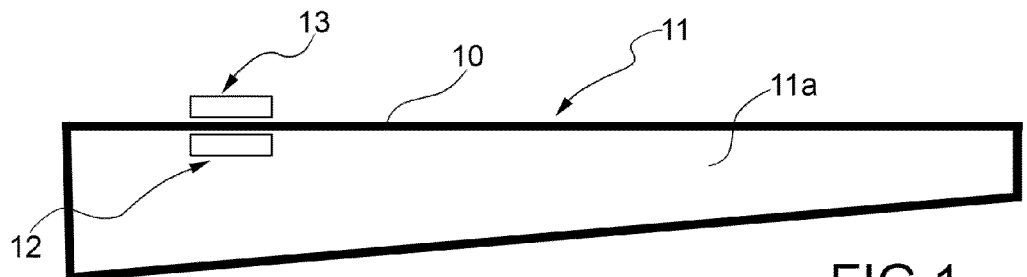
FIG. 1 is a schematic view, in cross section, of a hollow manufactured body in which the thickness of the walls is to be measured.

With reference to the drawings, the number 10 indicates a wall whose thickness is to be measured at a plurality of points. In this example, the wall 10 is a wall of an elongate hollow manufactured body 11, illustrated schematically in FIG. 1. In one possible application, the hollow body 11 can typically be an insert of the type currently used in an application, the hollow body 11 can typically be an insert of the type currently used in an autoclave associated with forming equipment (not shown) and intended to be enclosed in an impermeable tubular bag (not shown) to impart a specified shape. It is to be understood that the invention is not limited to the details of construction of the embodiment presented in the following description or illustrated in the drawings; the invention is also applicable to the measurement of the thickness of the walls of hollow bodies, such as tubes of annular cross section, whose shapes, sizes and industrial uses are different from those illustrated herein.

The hollow body 11, or at least the wall 10, is made from a non-ferromagnetic material. The hollow body 11 can typically be made from fibre-reinforced curable thermosetting material (or "composite material"). By way of example, the thickness of the irregular wall 10 can vary from about 1 mm to about 15 mm. The wall 10 has an inner surface 10a facing a cavity 11a of the hollow body 11, and an outer surface 10b on the opposite face of the wall 10.

Figure 2:
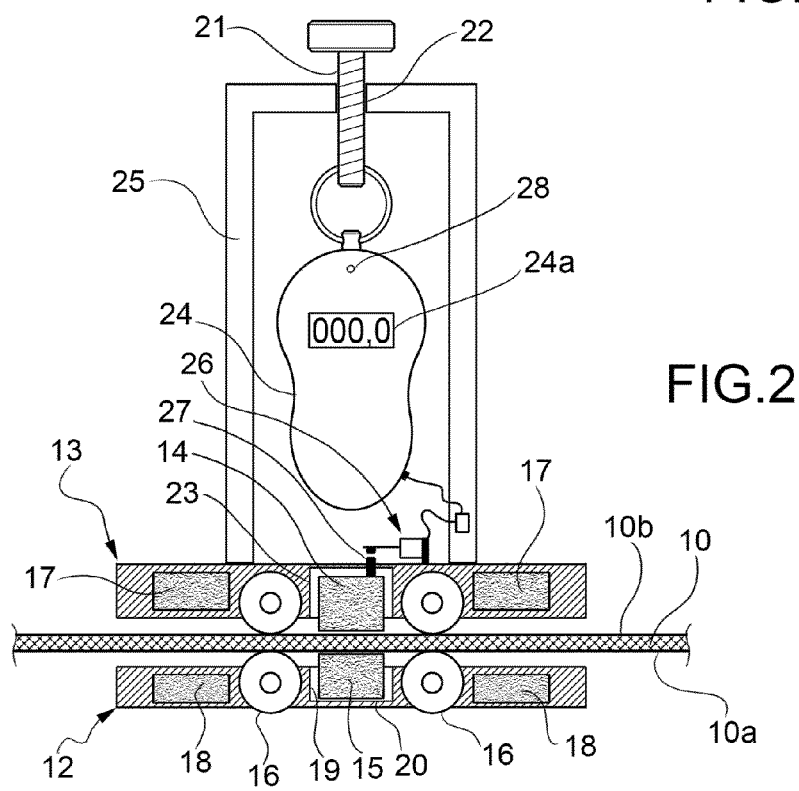
FIG. 2 is an enlarged schematic cross-sectional view of a measuring device applied to the two opposing surfaces of a wall of the hollow manufactured body of FIG. 1.

The measuring device shown schematically in FIG. 2 includes a slider 12 inside the hollow body 11 and an outer slider 13. The inner slider 12 is retained and pulled along the inner surface 10a of the wall 10 by means of the outer slider 13, which bears on the outer surface 10b of the wall 10 and can be moved manually so that it slides on the outer surface 10b. The two sliders 12 and 13 are magnetically coupled.

The invention is based on the principle that the strength of a magnetic field between two magnetic monopoles decreases as the distance between them increases. The thickness of the wall 10 is determined by measuring the force required to separate two elements forming a couple of mutually magnetically attracted elements. In a preferred embodiment, this couple of elements is formed by a couple of permanent magnets 14 and 15. The force required to separate a first magnet 14, movable together with the outer slider 13, from a second magnet 15 movable with the inner slider 12 is measured. When the outer slider 13 is moved along the outer surface of the wall, the inner slider 12 is pulled by magnetic attraction so as to follow the movements of the outer slider. Thus the thickness at any point of the walls of the hollow body 11 can be detected. In another embodiment, only one of the two elements 14 and 15, for example the element 14 on the outer slider 13, is a permanent magnet, while the other element 15 of the couple is formed by a block of ferromagnetic material such as iron, steel or nickel.

Each of the sliders 12 and 13, which in the specific embodiment shown in the drawing are provided with small wheels or balls 16 adapted to roll on the surfaces 10a and 10b, has one or more elements 17, 18 which attract each other magnetically, distributed on both the outer and the inner slider. In the preferred embodiment, all the elements 17, 18 are permanent magnets. Alternatively, some of these elements can be permanent magnets and the other elements can be blocks of ferromagnetic material which can be magnetically attracted by the permanent magnets located on the other slider. The number and arrangement of these elements, referred to here as "pulling magnets", can vary according to requirements. The elements can be incorporated in the sliders or fixed or fastened or simply placed on the two sliders 12 and 13. As an alternative to the wheels or balls 16 it is possible to use other rolling elements such as rollers or other elements adapted to reduce the friction of the sliders against the wall 10, such as a layer of low-friction material such as PTFE.

The pulling magnets attract each other in such a way that a movement imparted to the outer slider 13 on the outer surface 10b corresponds to an equal movement of the inner slider 12 on the inner surface 10a. In other words, the inner slider follows the movements of the outer slider, and the two sliders are still close to each other, being separated solely by the wall 10.

The magnets 14 and 15 are used, as stated, for measuring the mutual magnetic attraction. The inner measurement magnet 15 is housed in the inner slider in such a way that it is slidable in a direction substantially perpendicular (in use) to the plane in which the wall 10 extends at the point in question. In one embodiment, the magnet 15 is housed with a degree of play in a seat or housing 19 of corresponding shape, of cylindrical shape for example, which is open towards the wall to be measured and is preferably obstructed on the opposite side by a stop element 20 which serves to prevent the magnet 15 from falling into the cavity of the body 11, for example when the inner slider is under a horizontal portion of the wall to be measured, as in the condition shown in FIG. 2. The housing 19 is open towards the wall 10 in such a way that the magnet 15 can come into contact with the inner surface 10a and remain there, as a result of the attractive force exchanged with the outer measurement magnet 14.

The position of the outer measurement magnet 14 on the outer slider is adjustable in the direction of the thickness of the wall to be measured. In the illustrated embodiment, the magnet 14 is housed in a seat 23 which extends perpendicularly to the wall 10 to allow and guide the movements of the magnet with respect to the slider 13. In the specific illustrated embodiment, the magnet 14 is cylindrical in shape and is housed with a small degree of transverse play in the seat 23 which is also cylindrical. The magnet 14 is carried by an adjusting element 21, preferably an adjusting screw element, which is engaged in a threaded hole 22 formed in a bridgelike supporting element 25 on the outer slider 13.

A force transducer, in this example a commercially available digital dynamometer 24, shown schematically, is interposed between the adjusting screw 21 and the outer magnet 14, for measuring the force required to detach the outer magnet 14 from the outer surface of the manufactured body by overcoming the attractive force between the magnets 14 and 15. The transducer 24 is fastened to the screw 21 and to the outer magnet 14.

In order to measure the thickness of the wall 10 at a specific point, the outer slider 13 is slid manually along the outer surface 10b of the wall until it reaches the desired point. The inner slider 12 follows the sliding of the outer slider 13 as a result of the attractive force exchanged between the outer pulling magnets 17 and the inner magnets 18. When it has reached the desired position, the inner measurement magnet 15 comes into contact with the inner surface 10a of the wall.

The screw 21 is slowly unscrewed to raise the dynamometer 24 together with the outer measurement magnet 14, in opposition to the attractive force exerted between this magnet and the inner measurement magnet 15. Thus the screw 21 is turned to bring the outer magnet 14 to a predetermined distance (in this example 0.5 mm) from the surface 10b of the wall 10, and at this predetermined distance the dynamometer 24 is used to detect the magnetic attractive force exchanged between the two magnets 14 and 15 in this position. In other words, the dynamometer 24 measures the tractive force imparted by means of the screw 21 to raise the outer measurement magnet 14 to the predetermined distance away from the outer surface 10b. The numerical value of the magnetic attractive force is then read on a display 24a of the dynamometer 24 at the moment when the outer measurement magnet 14 reaches the aforesaid predetermined distance (in this example 0.5 mm) from the outer surface 10b of the wall 10.

The reaching of the aforesaid predetermined distance can be detected in various ways. In the illustrated example, this distance is detected by means of a relay microswitch 26 mounted on the outer slider 13. The microswitch 26 is switched by a stud 27 which projects from the top of the magnet 14 and which comes into contact with the microswitch 26 when the magnet 14 is raised to the aforesaid predetermined distance (0.5 mm) above the surface 10b. In other embodiments of the invention (not shown), the switch or microswitch can be switched in various ways which are not shown here, for example by positioning the microswitch in a different way with respect to the movable magnet 14.

Figure 3:
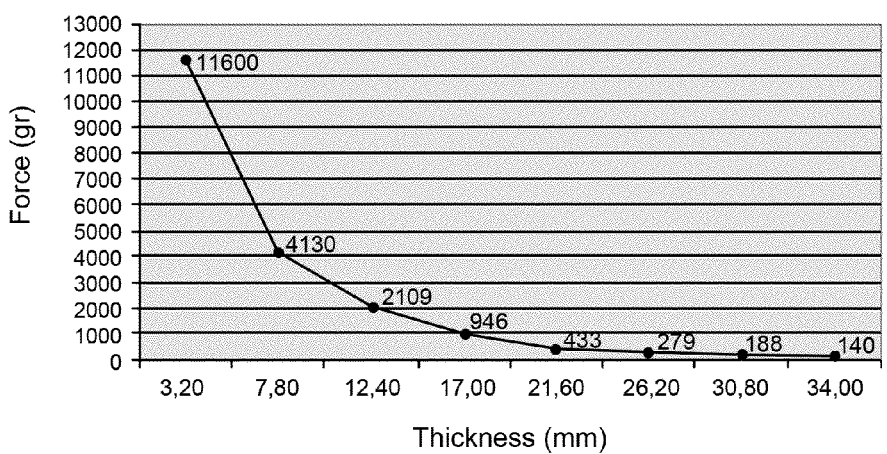
FIG. 3 is a diagram showing the thickness of the wall as a function of the magnetic force required to separate two magnets carried by the device of FIG. 2 on opposite sides of the wall which is measured.

The value of the local thickness of the wall 10 is determined by means of a calibration curve (FIG. 3) which shows values of force and corresponding thicknesses detected previously. The calibration curve, which is specific to the measurement device being used, expresses the thickness of the wall as a function of the measured force. The calibration curve can be plotted by executing the aforesaid procedure on calibration specimens having known thicknesses and made from the same material as the wall to be measured. In another embodiment (not shown), the dynamometer is provided with software in which one or more calibration curves are "mapped" for one or more materials from which the wall 10 can be made.

In the illustrated embodiment, the dynamometer 24 has a warning light and/or an acoustic alarm 28, for example an LED which is illuminated when the microswitch 26 is closed. When the microswitch is closed, power is supplied from the battery (not shown) to the LED dynamometer 28, thus illuminating it. As soon as it is illuminated, the operator stops turning the screw 21 and reads the dynamometer. The numerical value displayed at this moment on the display is the value of force indicating the thickness of the wall 10 at the point in question.

It is to be understood that the invention is not limited to the embodiment described and illustrated herein, which is to be considered as an example; in fact, the invention can be modified in respect of shapes, dimensions, arrangement of parts and materials used. The magnetic elements 14 and 15 can advantageously be of compact size, such that they come into contact with the wall by passing between the projections and crests thereof.

It will also be understood that the arrangement of the pulling magnets, which are fixed in couples to each slider on the side opposite the position of the measurement magnet, is not essential, but is simply preferable for the purpose of making the arrangement of the magnetic forces symmetrical with respect to the measurement magnet. In this way the inner slider can be balanced more satisfactorily and can be kept orientated adjacent to the inner surface of the wall at all times, whether it is moved forwards or backwards.

What is claimed is:

1. A method of detecting thickness of walls of elongate hollow bodies of carbon fiber composite material, the method comprising the steps of:
    a1) providing a hollow manufactured body having at least one wall of non-ferromagnetic material with an outer surface and an inner surface facing a cavity of the body;
    a2) providing an inner slider and an outer slider, comprising:
        a first couple of mutually magnetically attracted elements, wherein the first couple includes at least one permanent magnet accommodated in a seat of the inner slider, and at least one second permanent magnet or a second block of ferromagnetic material accommodated in a seat of the outer slider; wherein the element of the first couple of elements, located on the inner slider is accommodated in the seat in a freely slidable manner in a direction which in use is substantially perpendicular to a plane in which the wall extends at the point in question, and in which the seat is open towards the wall to be measured, wherein the element directly contacts the inner surface of the wall; and wherein the seat has, on the side opposite the side open towards the wall, a catch for limiting movements of the element in the seat away from the wall;
        at least a second couple of mutually magnetically attracted elements, wherein the second couple includes at least one permanent magnet located on the inner slider, and at least one second permanent magnet or a second block of ferromagnetic material located on the outer slider;
    b1) locating the inner slider on the inner surface of the wall, so that the corresponding element of the first couple of elements is free to contact the inner surface, and
    b2) placing the outer slider on the outer surface so that the corresponding element of the first couple of elements is free to contact the outer surface due to the magnetic attractive force mutually exchanged with the other element of the first couple;
    c) manually moving the outer slider across the outer surface to a predetermined point where the wall thickness is to be detected, wherein the inner slider on the inner surface follows the movements of the outer slider due to the magnetic attractive force mutually exchanged between the elements of the second couple;
    d) measuring, by a transducer device mounted on the outer slider and mechanically connected to the corresponding element of the first couple, the force required to detach the corresponding element of the first couple from the outer surface; and
    e) deriving, from the measured force, the value of the thickness of the wall in that predetermined point.

2. Method according to claim 1, wherein step d) includes the step of
    d1) gradually moving the element on the outer slider away from the outer surface up to a predetermined distance and detecting, by a force transducer mechanically connected to the element and the outer slider, the attractive force with which the element is attracted towards the wall at the predetermined distance.

3. Method according to claim 2, wherein in step d1) the element is moved away by an adjusting screw.

4. Method according to claim 2, wherein the outer slider is provided with a switch adapted to be switched to signal that the predetermined distance has been reached.

5. Method according to claim 1, wherein in step e) the thickness of the wall is determined by using one or more calibration curves correlating measured force values with corresponding thickness values of the wall.

6. Method according to claim 1, wherein both sliders are provided with rolling elements or layers of friction reducing material to facilitate the sliding motion of the sliders on the wall.

7. Method according to claim 1, wherein all the mutually magnetically attracted elements are permanent magnets.

8. Method according to claim 1, wherein the elements of the second couple of magnetically attracted elements are incorporated in the sliders or are fixed or fastened or located on the two sliders.

9. Method according to claim 1, wherein the element is carried by an adjusting screw which engages a threaded bore formed in a support element fixed to the outer slider.

10. Method according to claim 1, wherein the element is accommodated in a seat of the outer slider which extends perpendicularly to the wall to allow and guide movements of the element with respect to the outer slider.

11. Method according to claim 1, wherein the transducer device is associated with a display.

12. Method according to claim 4, wherein, upon reaching the predetermined distance, the switch mounted on the outer slider is switched by an element or portion fixed to the element.

13. Method according to claim 12, wherein switching of the switch causes a warning light or an acoustic alarm to turn on.

* * * * *